US 6,686,716 B1

(12) United States Patent
Predina et al.

(10) Patent No.: US 6,686,716 B1
(45) Date of Patent: Feb. 3, 2004

(54) TUNED OPEN-LOOP SWITCHED TO CLOSED-LOOP METHOD FOR RAPID POINT-TO-POINT MOVEMENT OF A PERIODIC MOTION CONTROL SYSTEM

(75) Inventors: Joe Paul Predina, Fort Wayne, IN (US); Harold L. Broberg, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 78 days.

(21) Appl. No.: 09/906,795

(22) Filed: Jul. 18, 2001

(51) Int. Cl.$^7$ ................................................ G05B 11/01

(52) U.S. Cl. ..................... 318/560; 318/561; 318/609; 318/610; 318/630; 318/632

(58) Field of Search ................................ 318/560, 561, 318/609, 630, 632, 610

(56) References Cited

U.S. PATENT DOCUMENTS

| | | | | |
|---|---|---|---|---|
| 4,439,716 A | * | 3/1984 | Minnich | 318/632 |
| 4,674,029 A | * | 6/1987 | Maudal | 364/148 |
| 4,742,444 A | * | 5/1988 | Gose et al. | 364/157 |
| 5,677,609 A | | 10/1997 | Khan et al. | |
| 6,013,996 A | * | 1/2000 | Howard et al. | 318/561 |
| 6,107,771 A | * | 8/2000 | Maeda | 318/630 |
| 6,326,758 B1 | * | 12/2001 | Discenzo | 318/609 |

FOREIGN PATENT DOCUMENTS

| | | | |
|---|---|---|---|
| DE | 0461627 A1 | * 12/1991 | G05B/19/39 |
| EP | 0 461 627 | 12/1991 | |

OTHER PUBLICATIONS

Donald E. Kirk, *Optimal Control Theory An Introduction*, 1970, pp. 227–228.

Hsin, et al., "Experiments Bridging Learning and Repetitive Control", Advances in the Astronomical Sciences vol. 95, part 2, 1997, pp. 671–690.

Katsuhiko Ogata, *Discrete–Time Control Systems*, Prentice–Hall, Inc., 1987, p. 626.

Dec. 1989, H. Ozisik and R.F. Keltie, "Development and implementation of a high speed open loop control technique for micropositioning of mechanical structures", Precision Engineering, vol. 11, No. 4, Oct. 1989, pp. 225–230.

H. Ozisik and R.F. Keltie, "Implementation of an open–loop control technique for high–speed micropositioing in a single–point diamond turning process", Precision Engineering, Vol 13, No. 2, Apr. 1991, pp. 83–94.

Zhishi, Xia and Sheldon S. L. Chang, "A Simple Robust Nonlinear Robotic Controller", Recent Trends in Robotics, El Sevier Science Publishing Co., Inc., 1986, pp. 317–328.

(List continued on next page.)

Primary Examiner—Robert E. Nappi
Assistant Examiner—Tyrone Smith
(74) Attorney, Agent, or Firm—Edell, Shapiro & Finnan, LLC

(57) ABSTRACT

A motor control method and apparatus produce rapid, point-to-point movement while minimizing settling time and peak power consumption in a servo-control system with a periodic input. Rapid open-loop movement is combined with tuning of the open-loop input based on position and velocity of the output when the loop is closed. Iterative learning control is used to adjust open-loop commands in subsequent cycles to reduce residual vibrations and quickly reach the desired final position. The apparatus and method can be used in motion control applications requiring rapid, periodic, point-to-point movement, such as weather satellite servo systems with a periodic input containing multiple step responses within each period.

17 Claims, 14 Drawing Sheets

OTHER PUBLICATIONS

Ronald L. Racicot, "Increasing Mission Reliability By Using Open–Loop Control" IEEE Transactions on Reliability, vol. 42, No. 3, Sep. 1993, pp. 384–392.

Ronald L. Racicot, "Limiting Servo Motor Torque Gradients With Near Minimum Time Repositioning", IEEE Transactions on Control Systems Technology, vol. 1, No. 4, Dec. 1993, pp. 284–289.

Hal Broberg, Paul Lin & Joe Predina, "Periodic, Multi–Step Tracking Control for Weather Satellite Scanning Mirror", J. of Dynamic Systems, Measurement and Control, vol. 123, Mar. 2001, pp. 85–92.

Kok Kia Chew and Masayoshi Tomizuka, "Digital Control of Repetitive Errors in Disk Drive Systems", IEEE Control Systems Magazine, Jan. 1990, pp. 16–20.

S. Arimoto, S. Kawamura, F. Miyazaki, and S. Tamaki, "Learning Control Theory for Dynamical Systems", IEEE Proc. Of $24^{th}$ Conf. On Decision and Control, Dec. 1985, pp. 1375–1380.

Predina, J., "Proposal for Infrared Temperature Sounder", vol. 1, Technical, Nov. 29, 1991, p. 1–24 through 1–30.

Toshiharu Sugie and Toshiro Ono, "An Iterative Learning Control Law for Dynamical Systems" Automatica, vol. 27, No. 4, 1991, pp. 729–732.

Broberg, H.L., 1993, "Theory and Optimization: The Coherent Error Integrator, East–West Mirror Servomechanixm, Geostationary Operational Environmental Satellite (GEOS)," Ph.D. dissertation, University of Toleda.

Li, W., and Cheng, X., 1994, "Adaptive High–Precision Control of Positioning Tables–Theory and experiments," IEEE Trans. Control Syst. Technol. 3, No. 3, pp. 265–270.

Robeck, L., Rathbun, D., and Lehman, D., 1991, IEEE Control Syst. Mag. 11, No. 3, pp. 46–52.

Smith, M., Annaswamy, A., and Slocum, A., 1995, "Adaptive control strategies for a precision machine tool axis," Precis. Eng. 17, No. 3, pp. 192–206.

Vira N., and Alagudu, M., 1995, "Precision measurements and control strategies of an automated two–dimensional grid plate testing machine," ISA Trans. 34, 101–116.

Kurfess, T.R., and Jenkins, H., 1996, "Ultra–High Precision Control," *The Control Handbook*, W.S. Levine, ed., CRC Press and IEEE Press, Chap. 77.3, pp. 1386–1405.

Armstrong–Helouvry, B., Dupont, P., and Canudas De Wit, C., 1994, "A Survey of Models, Analysis Tools and Compensation Methods for the Control of Machines with Friction," Automatica 30, No. 7, pp. 1083–1138.

Dahl, P., 1975, "Solid Friction Damping of Spacecraft Oscillations," The Aerospace Corporation, AIAA Paper No. 75–1104.

Inoue, T., Nakano, M., and Iwai, S., 1981, "High Accuracy Control of a Proton . . . Supply," International Federation of Automatic Control (IFAC) $8^{th}$ *Triennial World Congress*, Kyoto, Japan, published by Pergamon Press for IFAC, pp. 3137–3142.

Tomizuka, M., 1987, "Zero Phase Error Tracking Algorithm for Digital Control," ASME J. Dyn. Syst., Meas., Control 109, 65–68.

Wang, Y., and Longman, R., 1996, "Use of Non–Causal Digital Signal Processing in Learning and Repetitive Control," Adv. Astronaut. Sci., 90, 649–668.

Tomizuka, M., Anwar, G., and Fang, B., 1988, "Control of Robot Manipulators under Repetitive Tasks–Segmented Repetitive Control Approach," *Proceedings IEEE Workshop on Intelligent Robot Systems*, pp. 157–163.

Ho, H.T., 1997 "Fast Bang–Bang Seek Control," IEEE Trans. Magn. 29, No. 6, pp. 4522–4527.

Meckl, P.H., and Kinceler, R., 1994, "Robust Motion Control of Flexible Systems Using Feedforward Forcing Functions," IEEE Trans. Control Syst. Technol. 2, No. 3, pp. 245–254.

Singhose, W., Singer, N., and Seering, W., 1995, "Comparison of Command Shaping Methods for Reducing Residual Vibration," *Proceedings of the $3^{rd}$ European Control Conference*, pp. 1126–1131.

Pao, L.Y., and Singhose, W.E., 1998, "Robust Minimum Time Control of Flexible Structures," vol. 34, No. 2, pp. 229–236.

Tuttle, T.D., and Seering, W.P., 1999, "Creating Time–Optimal Commands with Practical Constraints," J. Guide. Control Dyn. 22, No. 2, pp. 241–250.

Broberg, H., and Molyet R., 1992, "Reduction of Repetitive Errors in Tracing of Periodic Signals: Theory and Application of Repetitive Control," *Proceedings of the $1^{st}$ IEEE Conference on Control Applications*, Dayton, OH.

Cosner, C., Anwar, G., and Tomizuka, M., 1990, "Plug in Repetitive Control for Industrial Robotic Manipulators," *Proceedings of the IEEE International Conference on Robotics and Automation*, pp. 1970–1975.

Tomizuka, M., "On the Design of Digital Tracking Controllers," J. of Dynamic Systems, Measurement and Control, vol. 115, Jun. 1993, pp. 412–418.

Inoue, J., et al., "High Accuracy Control of Servomechanism for Repeated Contouring," Proceedings of the $10^{th}$ Annual Symposium on Incremental Motion Control Systems and Devices, pp. 285–292, 1981.

* cited by examiner

TUNED OPEN-LOOP SWITCHED TO CLOSED-LOOP METHOD FOR RAPID POINT-TO-POINT MOVEMENT OF A PERIODIC MOTION CONTROL SYSTEM

GOVERNMENT INTERESTS

This invention was made with government support under Contract No. ECS-9633015 awarded by the National Science Foundation to the Purdue Research Foundation. The Government has certain rights in this invention.

BACKGROUND OF THE INVENTION

1. Field of the Invention

The invention relates to motor control and more particularly, to motor control applications requiring rapid, periodic, point-to-point movement.

2. Description of the Related Art

Rapid repositioning of an object being moved is accomplished using a motorized system, such as a servo system, that typically is controlled using one of the many known closed-loop control algorithms. A motor and the object moved by the motor are commonly referred to as a "plant." An example of such a plant is a rotating mirror that directs an image into a camera mounted in a weather satellite in which the camera photographs the earth. The motor periodically repositions the mirror to produce a series of photographs that together form an image of the earth. When variations in the plant are expected, adaptive control methods can be used to more accurately position the plant. When the movement is periodic, more specialized adaptive methods, including repetitive and learning control, are available.

Some modern periodic control systems require repositioning times that approach the minimum theoretically possible while also minimizing the peak power used. This requires a minimum-time, optimal solution that generally satisfies Pontryagin's minimum principle, described, for example, in *Optimal Control Theory*, Donald E. Kirk, Prentice-Hall Inc., pp. 227–228, 1970. This minimum-time, optimal solution requires an initial maximum acceleration followed by a maximum deceleration and is referred to in the art as bang-bang control. Bang-bang control is usually associated with an□open-loop control system. In theory bang-bang control moves a plant in a minimum amount of time. However, in practice overshoot and settling after the plant reaches its final position often occur. Variation from the desired position after the initial rapid movement from the bang-bang control usually has sinusoidal components that are referred to as residual vibration. This is a non-zero position error at the end of the bang-bang control operation, the amount of which oscillates as a damped sinusoid around the desired position as a result of the closed loop control moving the plant to eliminate the error. The residual vibration is due to disturbances, non-linlinear effects, resonance, time-related variations and other factors. Frequently, these factors cannot be accounted for, to the precision required, in a model of the control system.

Open-loop control techniques are common in the literature and have been shown to be effective in several areas of control. For example, open-loop control has been used with an input that is based on a plant model for a precision diamond turning application. In that application a hybrid (open and closed-loop) control law could be used. In another example, open-loop control has been used with a switching zone controller that causes motor torque to switch linearly from a maximum positive (acceleration) to a maximum negative (deceleration) value in a robotic application. In yet another example, a "modified bang-bang" controller uses open-loop control for rapid movement and switches to closed-loop control near the desired position to control a (military) tank gun-loader.

Conventional open-loop and open-loop/closed-loop systems, such as those discussed above, do not suffice in applications requiring rapid, periodic movement because they do not simultaneously minimize repositioning time, the peak power used and any residual vibrations. More particularly, they do not include algorithmic, repetitive tuning of open-loop input pulse amplitudes to the motor based upon position and velocity when the loop is closed to minimize residual vibrations resulting from closed-loop control.

SUMMARY OF THE INVENTION

The invention can solve the concurrent problems with conventional control systems of minimizing repositioning time, minimizing peak power used, and minimizing residual vibrations for a periodic system requiring rapid movement. Those problems can be solved by using an open-loop command such as a bang-bang control signal that is input to move the plant, then using closed-loop control to fine tune the movement to the desired position, and using a form of repetitive/learning control to adjust the bang-bang control signal parameters for subsequent periodic movements. The open-loop bang-bang control signal is determined to minimize saturation non-linearities in the electronics (e.g., due to peak voltages/currents) and in the motor (e.g., due to acceleration limits). The initial positive and negative amplitudes of the open-loop bang-bang input signal are calculated based on a model of the plant. The maximum and minimum amplitudes of the bang-bang input signal are then adjusted periodically using the repetitive/learning control.

There are advantages to using open-loop control switched to closed-loop control in applications requiring rapid, periodic movement, including the following.

1. Open-loop control can provide faster response than closed-loop control because the command signal input is coupled directly into the plant.
2. Open-loop control can be more efficient than closed-loop control because there are fewer components and response can be closer to time-optimal for point-to-point movement.
3. Linearity (no saturation) within the electronics and the plant (motor) can be maintained by limiting the highest frequency component and the maximum amplitude of the open-loop input command.
4. Closed-loop control reduces the effect of external disturbances and accurately holds the final position after the open-loop movement.

DETAILED DESCRIPTION

Figure 1:
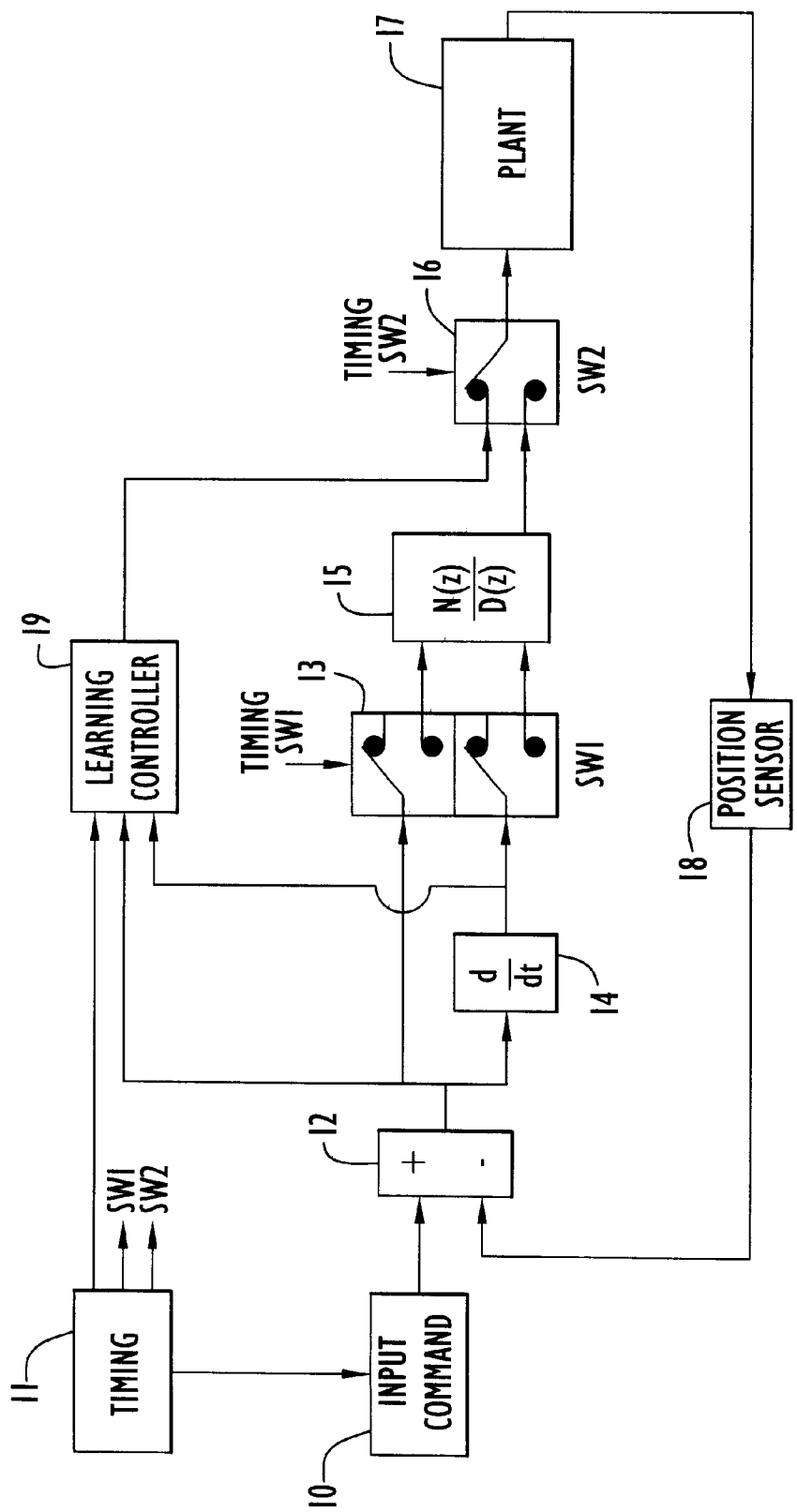
FIG. 1 is a block diagram of a model for the testing of open-loop control switched to closed-loop control.

Preferred embodiments according to the present invention are described below with reference to the above drawings, in which like reference numerals designate like components.

Applying an open-loop command, such as a bang-bang control signal, to a plant rapidly moves the plant while, in theory, minimizing the peak power used. However, open-loop, bang-bang control often results in overshooting the desired position thereby requiring a closed-loop control operation to fine-tune the plant's movement to the desired final position. This can cause the positioning to take much longer than is necessary. By using iterative learning control, that is, either learning control or repetitive control, according to the invention, the bang-bang control signal parameters can be adjusted for subsequent movements to reduce the amount of overshoot, and hence, reduce the amount of time to reach the desired position. Learning control considers the case where the control system always starts from the same initial condition and at the end of each run the data are used to choose a modified command to the control system for the next repetition. Repetitive control considers the situation where the control system is given a periodic command or is subject to a periodic disturbance, and need not return to the same initial condition before the next period starts.

Repetitive tuning of the amplitude of the closed-loop, bang-bang input based on the final position and velocity when the loop is closed is similar to the classical linear regulator problem, because the closed-loop responds to the initial conditions when the loop is closed.

A simplified block diagram of a simulation model for testing the inventive open-loop/closed-loop techniques is shown in FIG. 1. The simulation model includes an input command unit 10 for generating an open-loop input command in response to a timing signal output from a timing generator 11. The open-loop command is applied to a difference unit 12 that also receives actual position information concerning the position of a plant. The difference unit generates a position error signal and outputs that signal to a switch (SW1) 13, to a differentiator 14 and to a learning controller 19. The differentiator 14 differentiates the position error signal to generate a velocity error signal that is applied to switch (SW1)13. A timing signal SW1 output from timing unit 11 controls switch 13 to toggle between an open-loop position and a closed-loop position. When in the closed-loop position, switch 13 outputs the position error signal and the velocity error signal to a filter unit 15. The filter unit 15 performs a filtering function (N(z)/D(z)) that stabilizes the closed-loop, where N(z) is a numerator polynomial and D(z) is a denominator polynomial in Z-transform notation. The filtered output is applied to a second switch (SW2)16 that is controlled by a timing signal SW2 output from timing unit 11. Switch 16 applies the filtered closed-loop command to a plant 17, when timing signal SW2 indicates a closed-loop command time, to correct the position error in the plant's position. When in the open-loop position switch (SW2)16 outputs an open-loop command received from the learning controller 19.

At the beginning of each step movement of the plant, switches 13 and 16 open all loops (e.g. velocity and position loops), and the input command unit 10 generates an input position command that is input to the plant for moving it to the desired position represented by the input command. The open-loop command is provided to the plant 17, in accordance with the open-loop algorithm.

Figure 2:
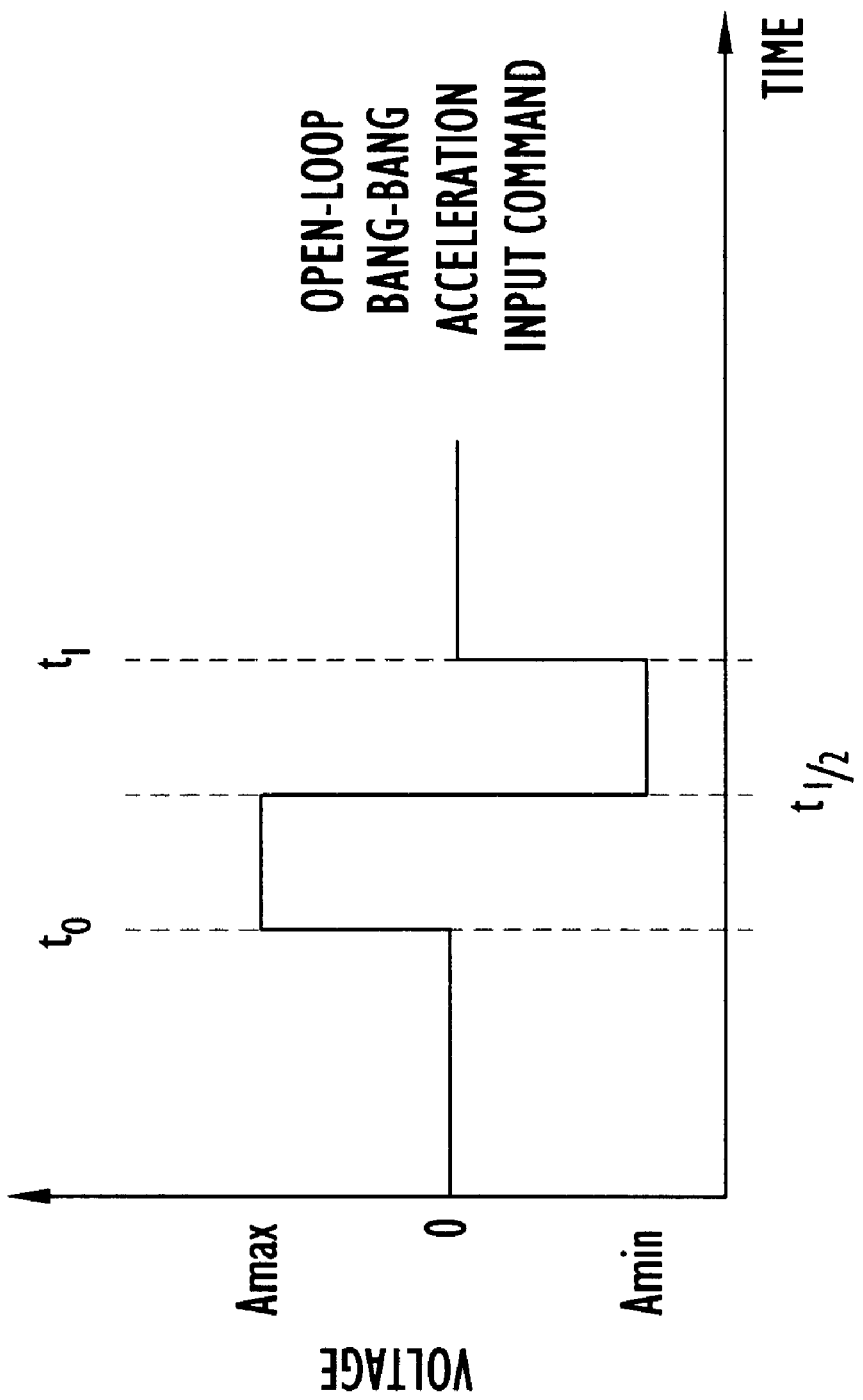
FIG. 2 is a graph showing a bang-bang control signal used as an open-loop command.
Figure 3:
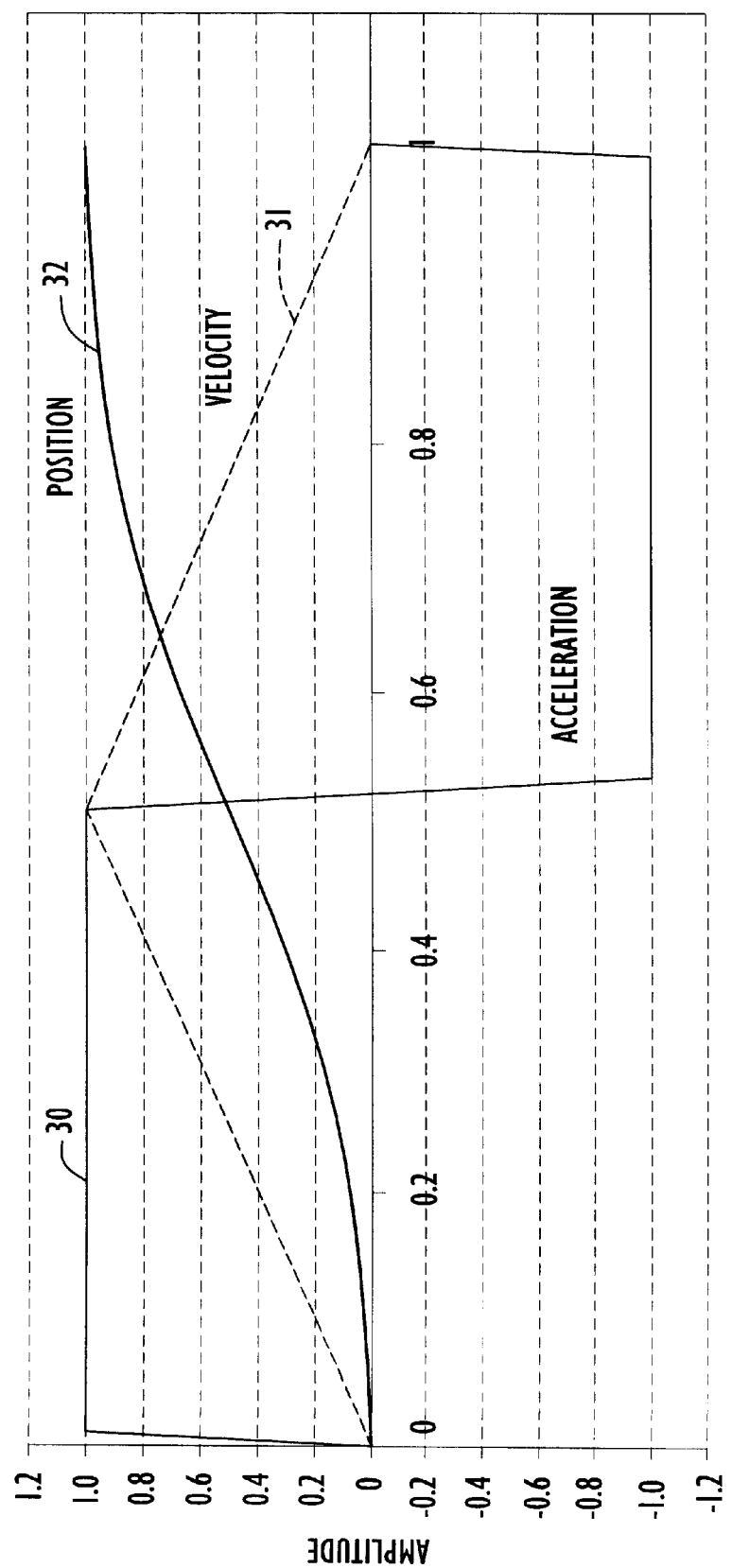
FIG. 3 is a graph showing an input signal, and velocity and acceleration waveforms, in which there is no friction (normalized) for the plant.

An ideal bang-bang control signal is shown in FIG. 2. An open-loop control signal 30, that is similar to the ideal bang-bang control signal, has a rapid rise and fall time as shown in FIG. 3, for example, and is used as the open-loop command. In practice, however, an ideal bang-bang waveform is not used, but instead, an open-loop control signal that is "close" to an ideal bang-bang waveform is used so that the motor's maximum acceleration (saturation of the motor) is not reached. However, for ease of reference, the open-loop control signal, such as control signal 30 shown in FIG. 3 for example, will be referred to as the bang-bang control signal. The bang-bang control signal, as shown in FIG. 2, includes a first portion, from time $t_0$ to $t_{1/2}$, with a positive amplitude $A_{max}$, and a second portion, from time $t_{1/2}$ to $t_1$, with a negative amplitude $A_{min}$. Although the bang-bang control signal is shown as a voltage signal, it will be understood that other types of signals can be used, such as a current signal.

The open-loop command input to the plant rapidly moves the plant to the desired position. After the open-loop command executes, the switches 13 and 16 are triggered to close the loop(s) and keep them closed until the next step movement. The closed-loop filter unit 15 responds to the initial conditions, such as any position overshoot and/or residual vibrations, created by the open-loop command at the time the loop is closed. Thus, if the plant position at the end of the open-loop input is close to the intended final position, with small velocity and acceleration components, the closed-loop filter 15 will cause the closed-loop system to rapidly settle to the desired final position with little residual oscillation.

General Algorithm Description

An ideal second order motion control device (such as a motor) without friction and without effects due to non-linearity or time-dependence can be considered as a double integrator. In FIG. 3, when a symmetrical, open-loop, bang-bang command (which can be considered as a torque, force, or acceleration) is provided as input as shown by signal 30 in FIG. 3, it is integrated to determine the output velocity, shown as the triangular waveform 31 in FIG. 3. In turn, the velocity waveform is integrated to determine the output position, shown as the parabolic waveform 32 in FIG. 3. Accordingly, for this ideal system, the velocity is symmetrical, the final velocity is zero and the final position is the desired position (normalized to 1 in the figure). For this case, there are no initial conditions when the loop is closed. Closing the loop serves only to hold the output at its desired final position and correct for external disturbances.

Figure 4:
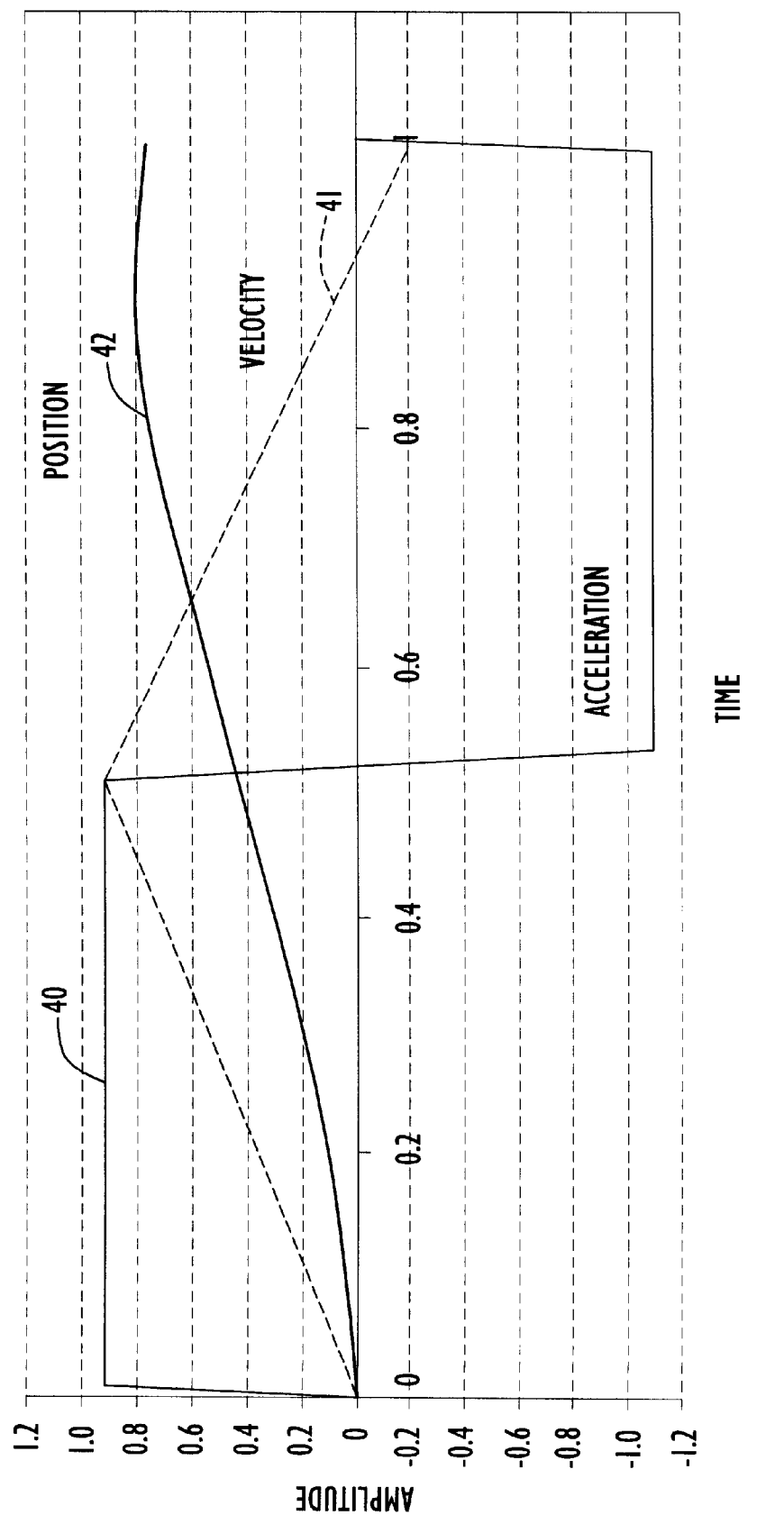
FIG. 4 is a graph showing the effect of friction on the final position and final velocity of the plant.

The ideal case, shown in FIG. 3, however, cannot be realized. In practice, the effect of friction on a motion control system is to oppose the input torque/force command. This can be considered as a decrease in the magnitude of the positive input command portion of the bang-bang command that causes the device to accelerate and an increase in the magnitude of the negative input command that causes the device to decelerate as shown by bang-bang command signal 40 in FIG. 4. The positive input command portion of signal 40 causes the device to accelerate and the negative portion causes the device to decelerate. The effect on the velocity of the output is shown in FIG. 4 as the triangular waveform 41. The final velocity when the open-loop command is completed is negative, and the desired final position (equal to "1"), shown as signal 42, is not reached.

Figure 5:
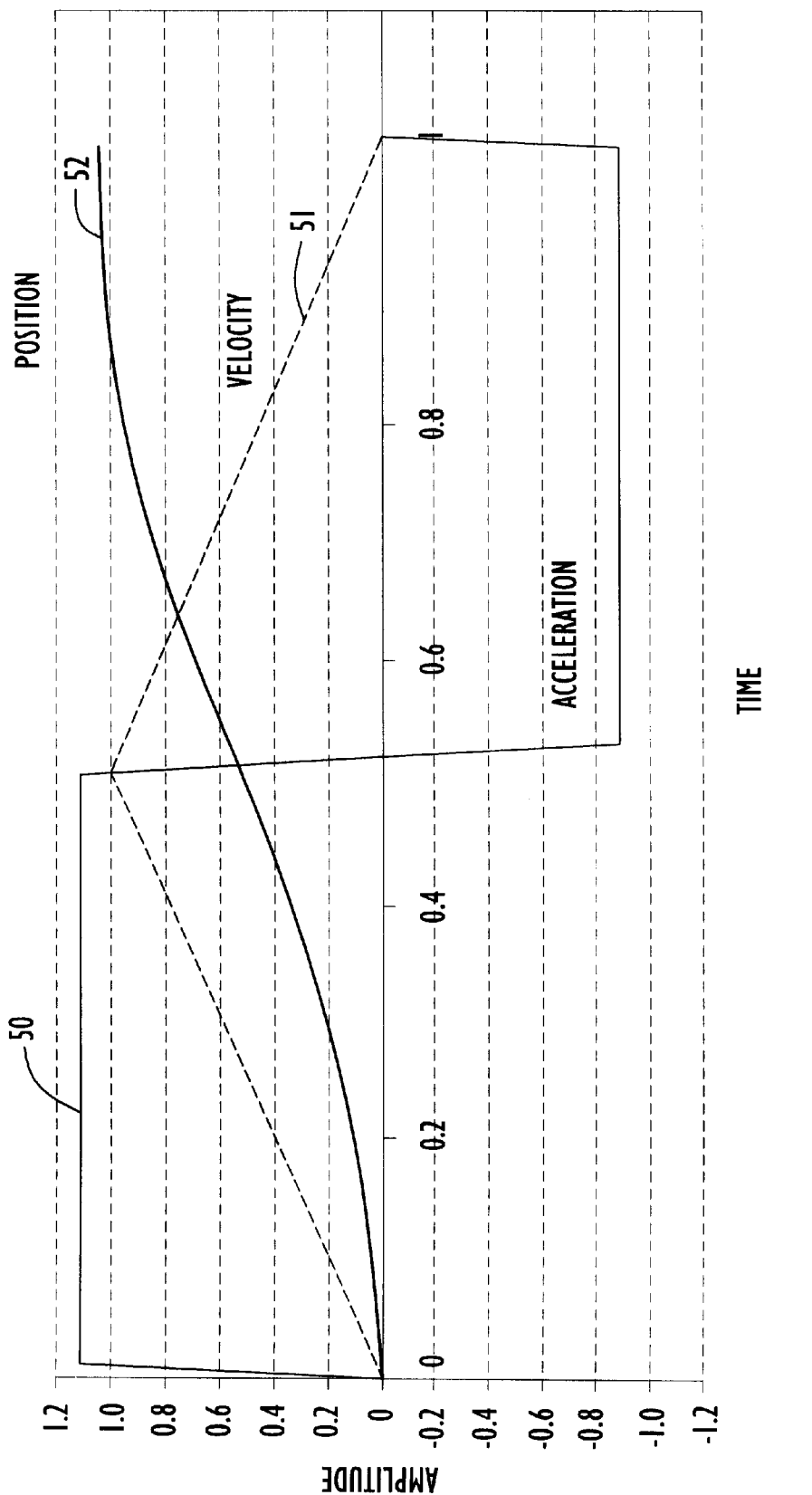
FIG. 5 is a graph showing the input signal, velocity and position waveforms for the plant, adjusted for a small velocity error.

To correct for the effects of friction so that the final velocity is close to zero, the magnitude of the positive input command (acceleration) portion of the bang-bang signal 40 must be increased, and the magnitude of the negative input command (deceleration) portion decreased. This produces an asymmetrical input command signal 50 as illustrated in FIG. 5. The final velocity at the end of the open-loop command can be made close to zero as shown by velocity waveform 51, but because of non-linear effects, such as Dahl friction, cogging torque, and bearing friction, the desired final position, shown by position waveform 52, (equal to "1") may not be reached. The actual final position can be less than or beyond the desired final position. In FIG. 5 the position waveform 52 is shown slightly beyond the desired final position of "1".

Figure 6:
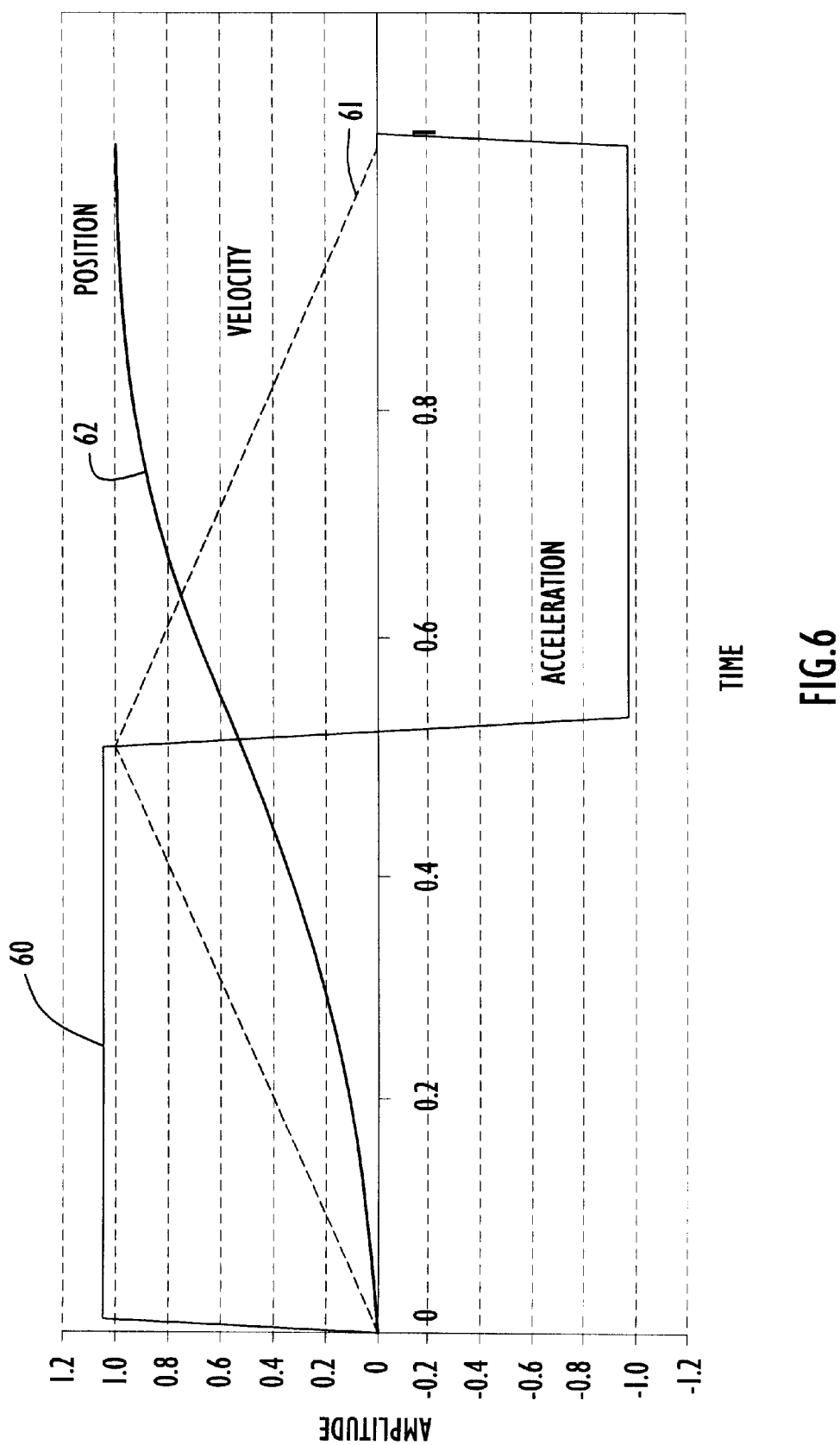
FIG. 6 is a graph showing the input signal, velocity and position waveforms for the plant, adjusted for a small position error.

To correct for these nonlinear effects, so that both the final position error and the final velocity are close to zero at the end of the open-loop, bang-bang command, the input acceleration command must be adjusted while retaining the same total area used in a previous dwell at this position, thus, keeping the final velocity close to zero. The magnitudes of the amplitudes of the positive and negative portions of the bang-bang input command are both increased, to increase the final position, or both decreased, to reduce the final position, by the same amount until the final position is located at the desired point. This is shown in FIG. 6 for a decrease in the magnitudes of the amplitudes of both portions of the bang-bang input command signal 60 so that the final velocity waveform 61 is close to zero at the end of the open-loop command and the position waveform is at the desired position.

A motor also has an electrical time constant due to inductance and wire resistance, that delays the input current. The motor's electrical time constant will delay the acceleration and torque provided by the motor. Adding a delay between the end of the open-loop input acceleration command, that is, the end of the bang-bang control signal, and the closing of the loop enables the current/acceleration/ torque to settle and be close to zero prior to closing the loop. Any change in final position and velocity due to this short settling period is corrected by the repetitive/learning control. This sequence provides position error, velocity, and acceleration close to zero when the loop is closed.

Description of Algorithm and Plant Simulated

An example of an application of the invention is its use in a detailed model of a servo system for simulating mirror pointing systems (for visible and infrared images) used aboard weather satellites. The model can contain many internal parameters for a three-phase, DC, brush-less motor and an associated wide bandwidth current driver for this same motor. Parameter variations associated with precision control and with long, unattended space operation can also be simulated. The effect of significant factors such as detent torque, static, viscous, and Dahl friction, bearing torque, temperature fluctuation, prolonged radiation exposure, and other life cycle parameter variations can be assessed using this model. Broberg, H. et al., "Periodic, Multi-Step Tracking Control for a Weather Satellite Scanning Mirror," ASME Transaction on Dynamic Systems, Measurement and Control, March 2001, incorporated by reference herein, provide additional details about such a model and descriptions of other simulations completed while investigating methods of providing rapid point-to-point movement for a weather satellite servo system.

The desired closed-loop algorithm is chosen by the user and tuned to provide the best response using a conventional closed-loop control algorithm. This closed-loop tuning does not depend on the periodic nature of the input. Switching times are determined based on measurements (or a model) of the plant to provide close to minimum time operation. The first cycle of the repetitive input uses predetermined motor parameters to calculate the amplitudes of the initial bang-bang command. A brief delay of approximately four electrical time constants is allowed during each iteration prior to closing the loop to enable the current/acceleration, which lags the position/velocity due to the motor's electrical time constant, to settle close to zero. For subsequent cycles, a form of iterative learning control, either repetitive control or learning control, simultaneously adjusts the final position and velocity close to zero by varying the positive and negative amplitudes of the open-loop bang-bang command. Calculations for the iterative learning control are accomplished during each closed-loop dwell of the system.

Figure 7:
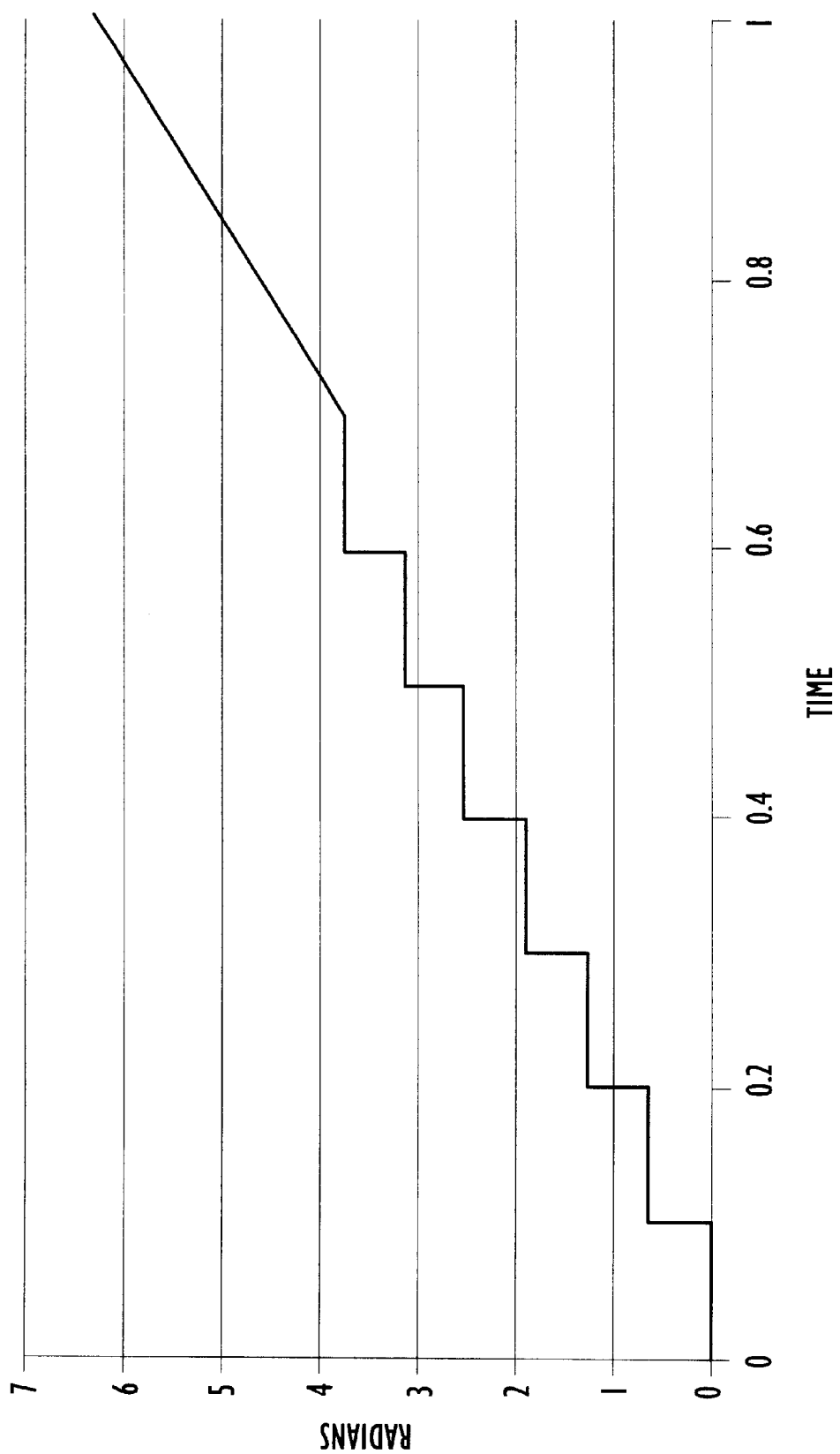
FIG. 7 is a graph showing the positioning steps for one cycle in a weather satellite application of the invention.

General Tuning:

An exemplary simulation system is a servo motor control system with a periodic, multi-step input. An example of one cycle of the desired position command is shown in FIG. 7, which shows a plurality of position steps the servo moves in one period of the cycle. As indicated by FIG. 7, at each step the servo holds its position while data (infrared or visible spectrometry), is gathered by a camera. For example, in a weather satellite, a servo having a mirror mounted thereto for directing light into a camera, is moved in steps to incremental positions for photographing the earth. After taking data at one position, the servo steps to a new position and gathers additional data. This sequence continues for a predetermined number of steps. When the step movements are completed (e.g., the earth is no longer visible for the weather satellite), the servo slews to the original position (one complete cycle, or $2\pi$ radians) and begins the cycle again.

The motor control system can be programmed for the following sequence to occur repetitively, using a simulator for example, beginning at the initial time of each step movement shown in FIG. 7.

1. The velocity and position loops are opened and the open-loop command is initiated.
2. For each position step in the cycle, when the system loops are closed:
   a. the open-loop command is 0 (except for a possible motor drive offset to null motor detent torque)
   b. the motor position and velocity are measured and stored in memory, c. the system input command (on the left side of FIG. 1) is at the desired position.
3. The closed-loop system acts on the initial conditions, drives the output to the desired position, and holds it there.
4. The closed-loop system remains in this final position for a predetermined time prior to the next movement. During this time, the amplitudes of the bang-bang command for the next repetitive cycle are calculated, based on the algorithm, dependent on the motor position and velocity when the loop was closed.

The above sequence is repeated for each of the plurality of position steps during one revolution of the servomotor. Then, the new sequence of open-loop input commands, calculated during the preceding cycle, is used to improve the performance of the motor control system during the next cycle. This sequence is repeated until a specified tolerance is met. Calculations and algorithms that can be used for such a simulation are discussed below:

First Cycle Calculation:

Acceleration for a DC motor with no friction is given by equation 1, $$A = I * K_t J \quad (1)$$

where A is the acceleration, I is the input current, $K_t$ is the torque constant of the motor, and J is the inertia of the motor and load. If the motor inductance and back-emf are ignored, the motor current is given by equation 2, $$I = V_1 / R_M \quad (2)$$

where $V_1$ is the input voltage and $R_M$ is the motor winding resistance.

An ideal bang-bang input acceleration (similar to that shown in FIG. 2) produces a velocity, which is the integral of the acceleration. So, for a total bang-bang time of $t_1$, the maximum velocity ($V_M$) is given by equation 3

$$V_M = A * t_1 / 2 \quad (3)$$

and the velocity waveform is triangular as shown in FIG. 3. The final position ($P_F$) is the integral of the velocity over the entire time $t_1$ as shown in equation 4.

$$P_F = \frac{1}{4} A * t_1^2 \quad (4)$$

This provides a relationship between the final position, the input voltage and the bang-bang time as shown by equation 5.

$$P_F = \frac{1}{4} I \left( \frac{K_t}{J} \right) * t_1^2 \quad (5)$$

Given a desired final position, and a desired maximum motor current (to retain linearity), the time required for this ideal case (minimum time) $t_1$ can be determined.

Several linear estimates of nonlinear effects can be used to improve the initial calculation of the input voltage amplitudes.

1. A ramp input voltage (an approximation to the actual exponential) can be used to model the finite rise time of the acceleration. The effect on the area under the acceleration (FIG. 3)

$$\frac{t_R}{t_1}$$

where $t_R$ is the time during which the ramp is on. The effect of the ramp is to reduce the maximum acceleration. The magnitudes of the input bang-bang command are increased by this percentage.

2. A linear estimate of the effect of the moving friction is given by equation 6

$$\frac{K_V * t_1}{4 * J} \quad (6)$$

based on a rectangular bang-bang input, where $K_V$ is the viscous drag coefficient for the motor. This friction opposes the input torque and reduces the acceleration during the positive input pulse and increases the deceleration during the negative input pulse. The maximum magnitude of the positive input pulse is increased by this percentage and the maximum magnitude of the negative input pulse is decreased by this percentage. This changes the area under the input bang-bang type command.

3. A linear estimate of the motor back emf is given by equation 7, $$\frac{K_b * K_t * t_1}{R_M * J * 4} \quad (7)$$

based on a rectangular bang-bang input and where $K_b$ is the motor back emf constant. The effect of the back-emf is to oppose the input voltage to the motor. This produces an effect similar to the friction effect for this linear estimate. The maximum magnitude of the positive input pulse is increased by this percentage and the maximum magnitude of the negative input pulse is decreased by this percentage. This also changes the area under the input command. Using a current driver for the motor can also eliminate the effect of the motor back emf. The first estimate above (numbered paragraph 1) corrects the final position and the second and third estimates (numbered paragraph 2) and (numbered paragraph 3) adjust both final velocity and position to provide an initial input command prior to beginning the repetitive corrections.

Repetitive Tuning:

The changes in position and velocity at the end of the open-loop command are directly related to the amplitude and area of the bang-bang type of open-loop input. Therefore, the error convergence condition depends only on the direct transmission term in this learning control scheme as described by Toshiharu, Sugie and Toshiro, Ono, "An Iterative Learning Control Law for Dynamical Systems," Automatica, vol. 27, no. 4, pp 729–732, 1991. These relationships are close to linear and can be expressed as a set of equations using the following variables.

$\Delta P_f \equiv$ Change in final position=final position at the time the loop is closed minus final position from previous cycle at the time the loop was closed.

$\Delta V_f \equiv$ Change in final velocity=final velocity at the time the loop is closed minus final velocity from previous cycle at the time the loop was closed.

$\Delta A \equiv$ Change in magnitude, (|Amplitude|), of both the positive and negative amplitudes of the open-loop bang-bang, acceleration input. For instance, if the positive bang-bang amplitude is +10 and the negative bang-bang amplitude is −8 and $\Delta A$=+0.5, the resulting bang-bang command would be +10.5 and −8.5 (e.g. both magnitudes are increased by $\Delta A$).

$\Delta S \equiv$ Shift in area of the open-loop command, expressed in terms of amplitude. For instant, if the positive bang-bang amplitude is +10 and the negative bang-bang amplitude is −8 and $\Delta S$=−0.3, the resulting bang-bang command would be +9.7 and −8.3 so that the entire waveform is shifted down by 0.3 in amplitude. So ΔS=current area of bang-bang input command— previous cycle area of bang-bang input command.

The resulting linear equations are shown as Eqs. (8) and (9) where a, b, c, and d are constants determined from measurements or parameter models of the motor and load. These equations state that the change in final position and the change in final velocity from one cycle to the next are linearly related to the change in magnitude and the change in area of the bang-bang input command.

$$\Delta P_f = a^* \Delta A + b^* \Delta S \quad (8)$$

$$\Delta V_f = c^* \Delta A + d^* \Delta S \quad (9)$$

Solving Eqs. (8) and (9) for ΔA and ΔS provides a set of linear equations that can be used directly in the learning control algorithm to continuously reduce both the error in the final position and the final velocity. Eqs. (10) and (11), below, are used to calculate the required change in magnitude and area of the bang-bang input command to reduce the position error and final velocity to zero during the next cycle, in which e, f, g and h are constants.

$$\Delta A = e^* \Delta P_f + f^* \Delta V_f \quad (10)$$

$$\Delta S = g^* \Delta P_f + h^* \Delta V_f \quad (11)$$

Based on these relationships, the following algorithm can be used to repetitively correct the magnitude of the amplitude and area of the open-loop bang-bang input command to reduce the position error and the velocity when the loop is closed.

Motor Control Apparatus Using Iterative Learning Control

Figure 8:
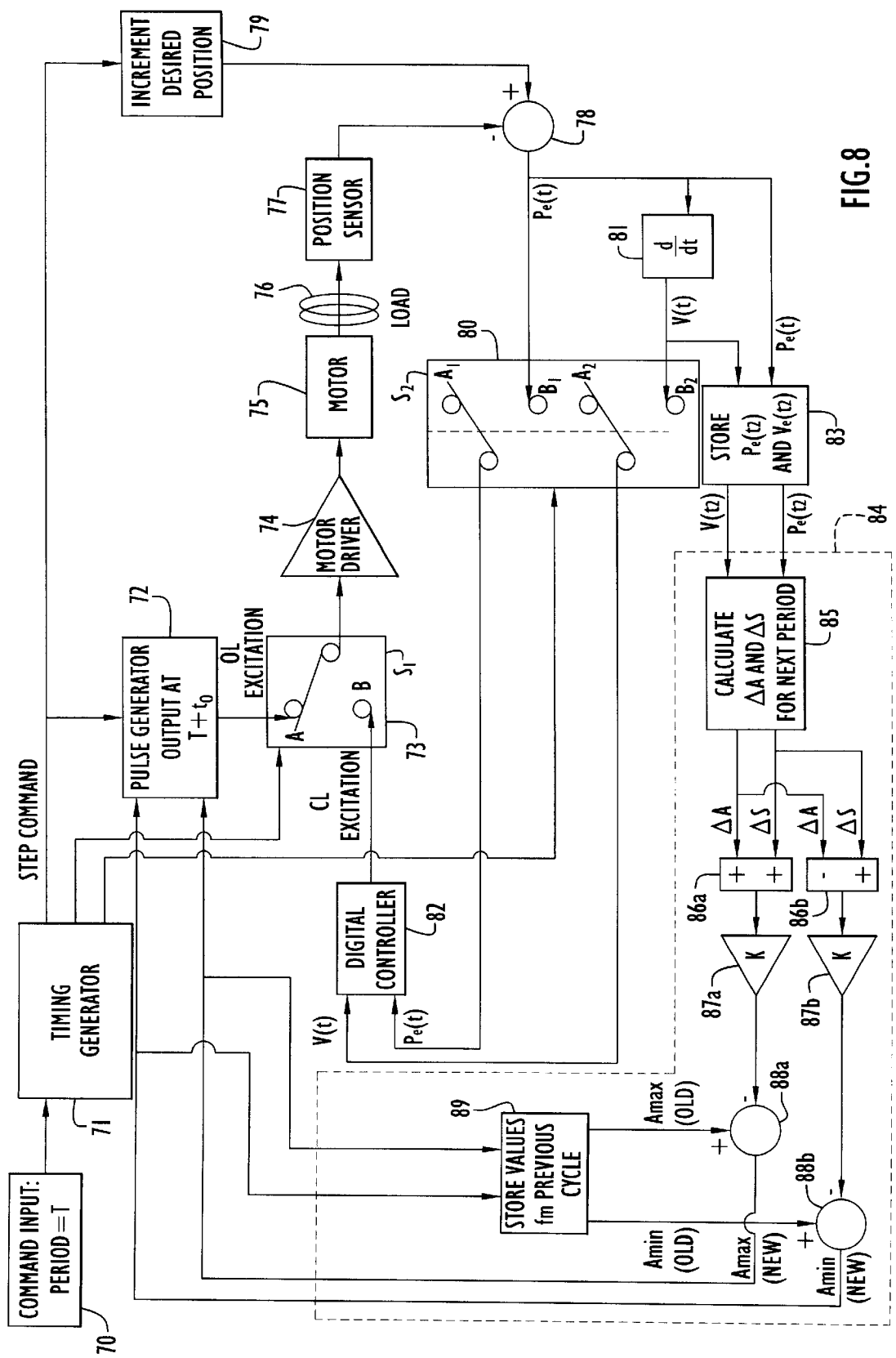
FIG. 8 is a block diagram of a motor control apparatus according to an embodiment of the invention.
Figure 9:
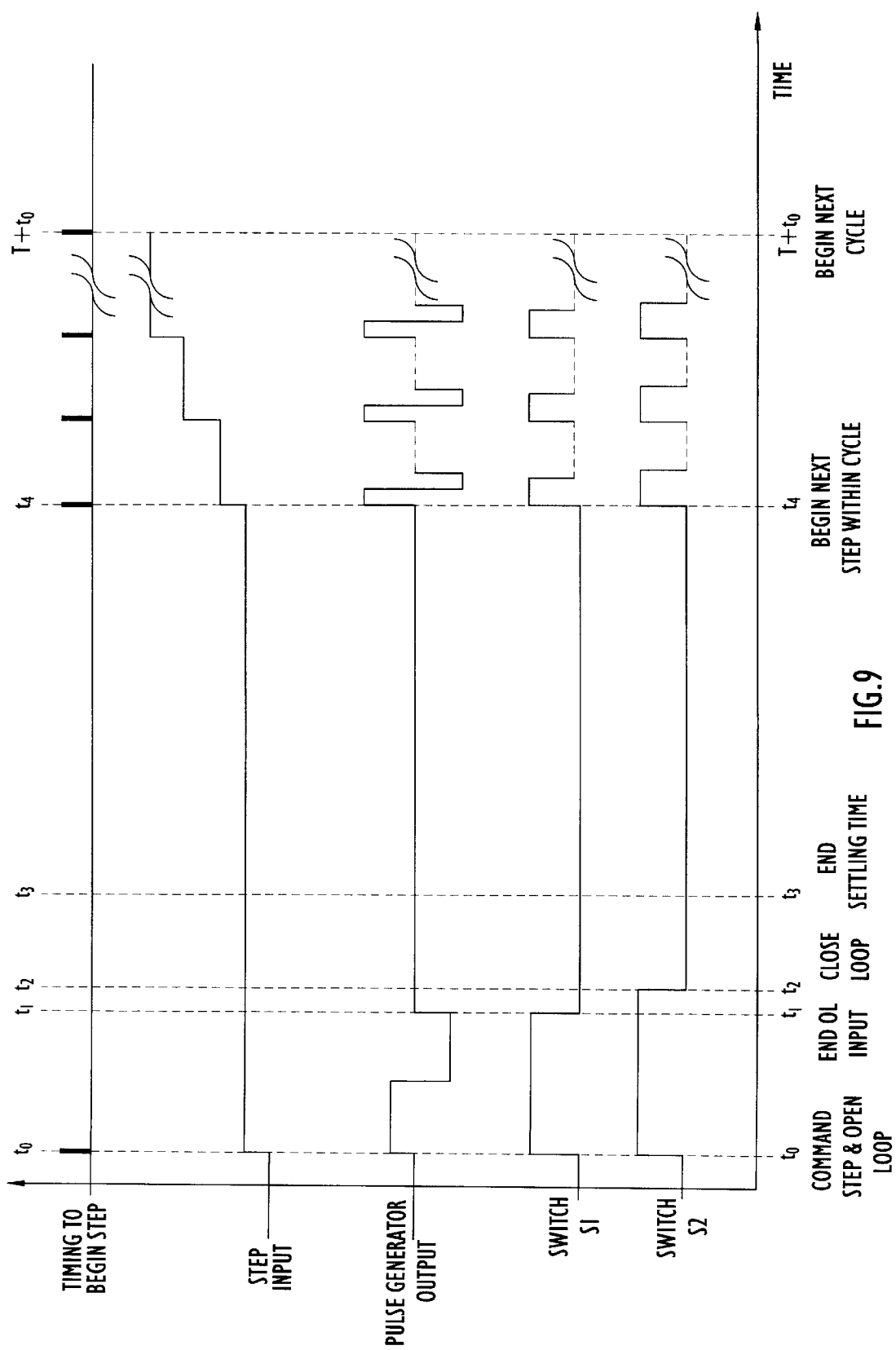
FIG. 9 is a timing diagram of signals used in the apparatus shown in FIG. 8.

A block diagram of an exemplary motor control apparatus that uses iterative learning control, according to the invention, is shown in FIG. 8 and a timing diagram for the apparatus is shown in FIG. 9.

The motor control apparatus of FIG. 8 includes a command input unit 70 that outputs a scan command at the beginning of the cycle shown in FIG. 7, where the cycle has a period T. The cycle of period T includes a plurality of position steps that each moves the plant a predetermined amount, in this case corresponding to a certain number of radians. A timing generator 71 is connected to the command input unit 70, and generates trigger pulses used throughout the motor control system. A pulse generator 72 receives a step command output from timing generator 71, to produce an open-loop command signal, such as a bang-bang control signal shown in FIG. 2. A switch (S1) 73 switches between an open-loop pole A, connected to the output of pulse generator 72, and a closed loop pole B. The switch (S1) 73 provides its output to a motor driver 74 that drives a motor 75. The motor moves a load 76, such as a data gathering device, for example, a camera or mirror in this case. A position sensor 77 detects a position of the load and motor, and outputs a measured position signal to an subtractor 78. The subtractor 78 also receives from a position unit 79 position information that indicates the desired position to which the plant is intended to be moved.

The subtractor 78 subtracts the measured position from the desired position and outputs a position error signal $P_e(t)$. The position error signal $P_e(t)$ is input to a first closed-loop pole $B_1$ of a switch (S2) 80. Switch (S2) 80 also includes unconnected poles $A_1$ and $A_2$. A differentiator 81 generates a velocity signal V(t) by differentiating the position error signal $P_e(t)$. Alternatively, a separate velocity sensor can be used to detect the velocity of the plant. The differentiator 81 outputs the velocity signal V(t) to a pole $B_2$ of switch (S2) 80.

Switch (S2) 80, when in the closed-loop position (i.e., connected to poles $B_1$ and $B_2$), outputs the position error signal $P_e(t)$ and the velocity error signal V(t) to a digital controller 82. The digital controller 82 effects the closed-loop control by outputting a closed-loop excitation signal to switch (S1) 73 for fine-tuning the motor's position to bring the position error $P_e(t)$ to substantially zero or below some predetermined threshold error value.

The motor control apparatus of FIG. 8 also includes a storage unit 83 for storing position and velocity information. An iterative learning control unit 84 is connected to the output of the storage unit 83. The iterative learning control unit 84 calculates changes to parameters of the open-loop command based on the position error and velocity measurements of the present cycle, and based on open-loop command parameters used for the same position step in one or more previous cycles. That is, using either learning control or repetitive control the iterative learning control unit 84 determines adjustments to the open-loop command based on adjustments made during previous cycles in moving the motor to the same position to which the motor is intended to move in the present cycle. The iterative learning control unit 84 includes a parameter calculation unit 85 that calculates the parameters ΔA and ΔS based on the velocity V(t) and position error $P_e(t)$ signals, as shown above in equations 10 and 11. The parameters ΔA and ΔS are input to adder 86a and subtractor 86b, and the output of adder 86a and subtractor 86b are applied to gain amplifiers 87a and 87b to apply a gain of K, according to equations 12 and 13 set forth below. Subtractors 88a and 88b receive the outputs of amplifiers 87a and 87b, respectively, and subtract open-loop command parameters used in a previous cycle. Here, outputs of the amplifiers 87a and 87b are subtracted from the maximum and minimum amplitude values, $A_{max}$ and $A_{min}$, respectively, that were used in the previous cycle. These amplitude values from the previous cycle are referred to as $A_{max}$(old) and $A_{min}$(old). The preceding parameters $A_{max}$(old) and $A_{min}$(old), are stored in and output from a memory 89. The subtractors 88a and 88b output new open-loop parameters, here, $A_{max}$(new) and $A_{min}$(new), that are then stored in memory 89 for use in a subsequent cycle, and input to the pulse generator 72 for use in adjusting the next open-loop commend.

Operation of the Motor Control Apparatus Using Iterative Learning Control

The motor control apparatus of FIG. 8 operates as described below and in conjunction with the timing diagram of FIG. 9.

A. The first cycle open-loop amplitudes are calculated as described in the section on First Cycle Calculation and applied so that the outputs $A_{min}$(old) and $A_{max}$(old) in FIG. 8 are 0 during the first cycle, from times $t_0$ to $t_1$, in FIG. 9. The cycle begins by command input unit 70 outputting the step input command signal at time $t_0$ as shown in FIG. 9. Timing generator 71 generates an open-loop step command signal at time $t_0$ as shown in FIG. 9, that triggers the pulse generator 72 to generate the open-loop command, bang-bang control signal from $t_0$ to $t_1$.

B. At the end of each open-loop acceleration command, at time $t_1$, the timing generator 71 activates a switch signal S1 shown at the bottom of FIG. 9. This signal controls switch (S1) 73 to move to pole B to allow the servo motor current to settle for approximately 4 electrical time constants to reduce the motor current at the time of closing the loop. This motor current reduction time is shown in FIG. 9 as the time from $t_1$ to $t_2$.

C. Timing generator 71, at time t2 activates a switching signal S2, shown at the bottom of FIG. 9, to operate switch (S2) 80 to switch to the closed-loop position (pole B). The position error and velocity when the loop is closed are measured and stored in memory 83. Note that the desired final velocity is zero so that velocity and velocity error are identical.

D. The corrections are calculated from times $t_3$ to $t_4$, after an additional settling period from $t_2$ to $t_3$ lapses. The corrections are calculated according to Eqs. (10) and (11). The maximum and minimum amplitudes for the next cycle of the open-loop bang-bang command are calculated from Eqs. (12) and (13):

$$\text{NewMaxAmpl} = \text{OldMaxAmpl} - K*(\Delta A + \Delta S) \quad (12)$$

$$\text{NewMinAmpl} = \text{OldMinAmpl} - K*(-\Delta A + \Delta S) \quad (13)$$

Operations B, C, and D are repeated for each step in the cycle, shown from times $t_4$ to the end of the cycle/beginning of the next cycle $T+t_0$.

From the linear calculations, to move from the current position error and velocity to zero position error and zero velocity, the positive pulse of the bang-bang input command must be decreased by $(\Delta A + \Delta S)$ and the negative pulse of the bang-bang input command must be decreased by $(-\Delta A + \Delta S)$. K is the learning control gain and must be less than or equal to 1 for stability. As K becomes smaller, the number of learning cycles increases, but the algorithm is stabilized with higher margins. Repetitive and learning control techniques, such as those described by Chew, K. and Tomizuka, M., "Digital Control of Repetitive Errors in Disk Drive Systems," IEEE Control Systems Magazine, pp. 16–20, January 1990; and Arimoto, S., Kawamura, S., Miyazaki, F.; and Tamaki, S., "Learning Control Theory for Dynamical Systems," Proceedings of $24^{th}$ Conference on Decision and Control, IEEE, pp. 1375–1380, December 1985, incorporated herein by reference, also can be used to ensure that the system response remains stable.

This tuning can be continuous after the initial adjustment to eliminate long-term effects due to temperature, radiation, bearing wear, cogging torque of the motor, gravity/imbalance torque, and other nonlinearities.

Simulation Results

Figure 10:
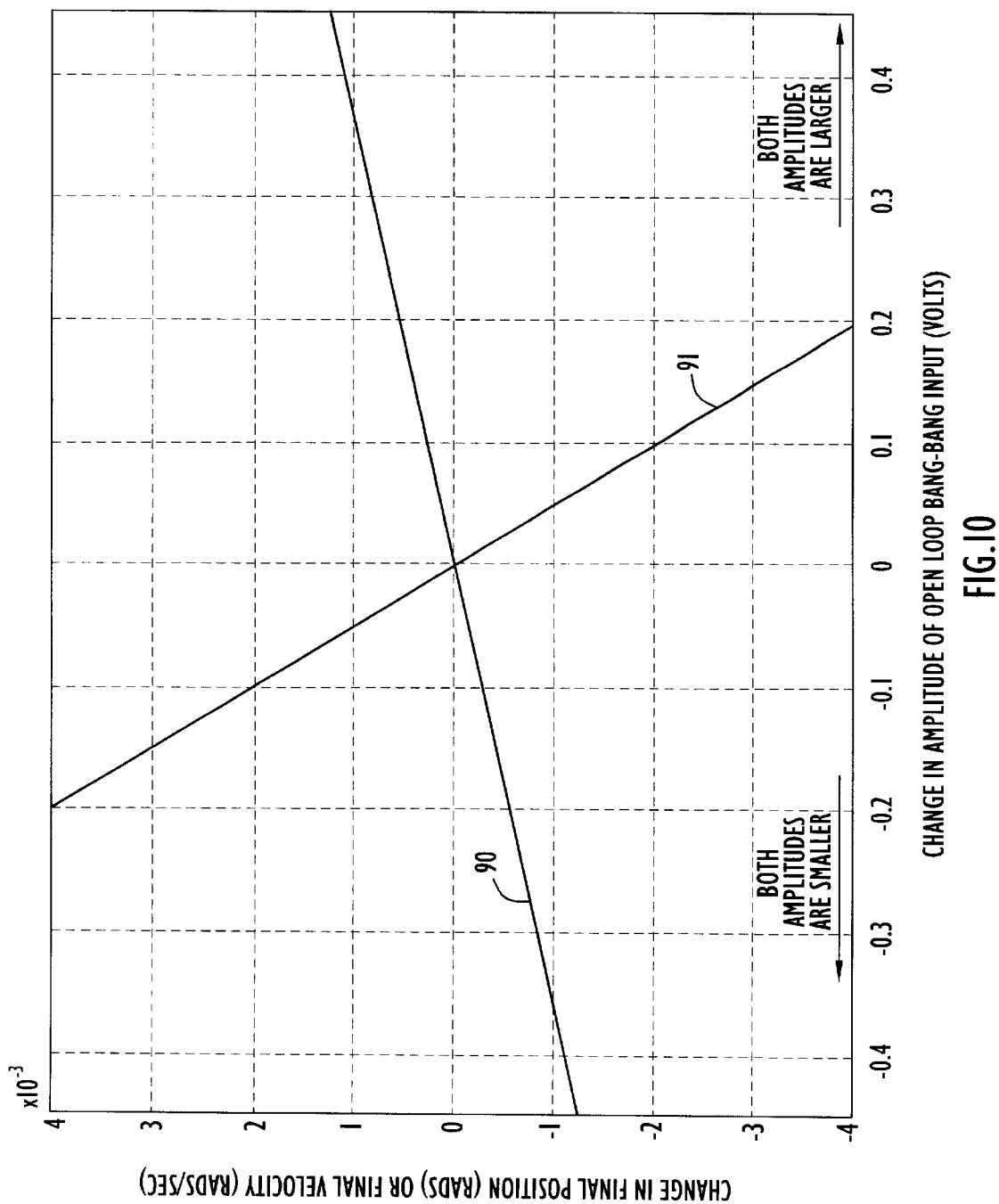
FIG. 10 is a graph showing a change in final plant position and velocity versus a change in magnitude of an input open-loop command.

A servomotor was modeled and a symmetrical, open loop, bang-bang, input command (in volts) was provided. A series of simulations was performed to determine the change in final position and final velocity at the end of the open loop caused by a change in magnitude (|amplitude|) of the input. A portion of the result is shown in FIG. 10. Both the change in final position 90 and final velocity 91 were quite linear over a range of ±2 volts and highly linear over the smaller voltage range shown in FIG. 10. The slope of the change in final position (2712 µradians/volt) provides the constant, a, in Eq. (8). The slope of the change in final velocity (−0.020319 (rads/sec)/volt) provides the constant, c, in Eq. (9).

Figure 11:
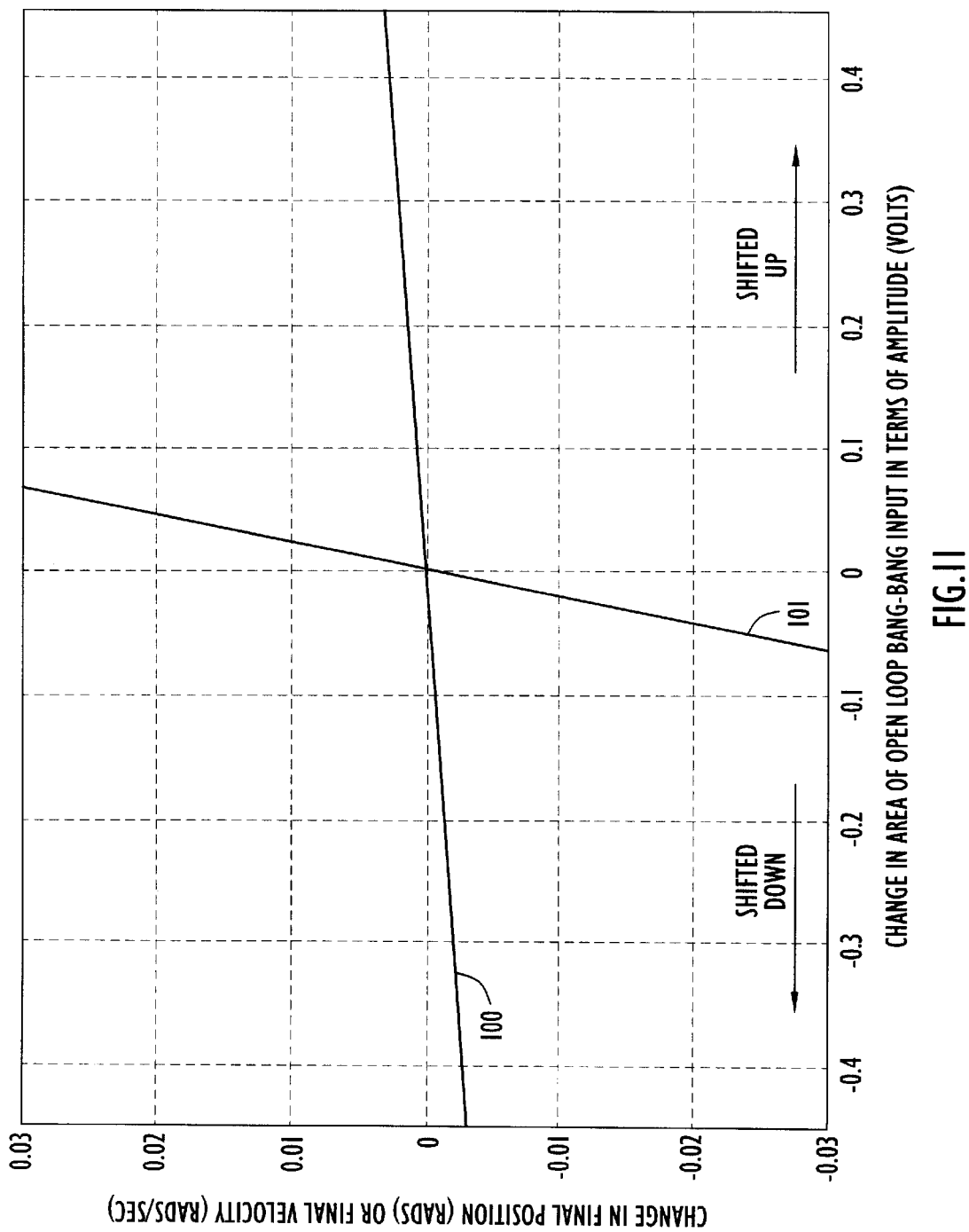
FIG. 11 is a graph showing a change in final plant position and velocity versus a change in area of an input open-loop command.

A second series of simulations was performed to determine the change in final position and final velocity at the end of the open loop caused by a change in area of the open loop, bang-bang input. For a time-symmetrical bang-bang input of fixed time, t, if a constant, C, is added to both the positive and negative amplitudes, the area is increased by C*t. Similarly, if a constant, K, is subtracted from both the positive and negative amplitudes, the area is decreased by K*t. Thus, the change in area can be measured in terms of the change in amplitude of the bang-bang input. FIG. 11 shows the result of these simulations. The slope of the change in final position 100 (6549 µradians/volt) provides the constant, b, in Eq. (8) and the slope of the change in final velocity 101 (0.4349 (rads/sec)/volt) provides the constant, d, in Eq. (9).

Figure 12:
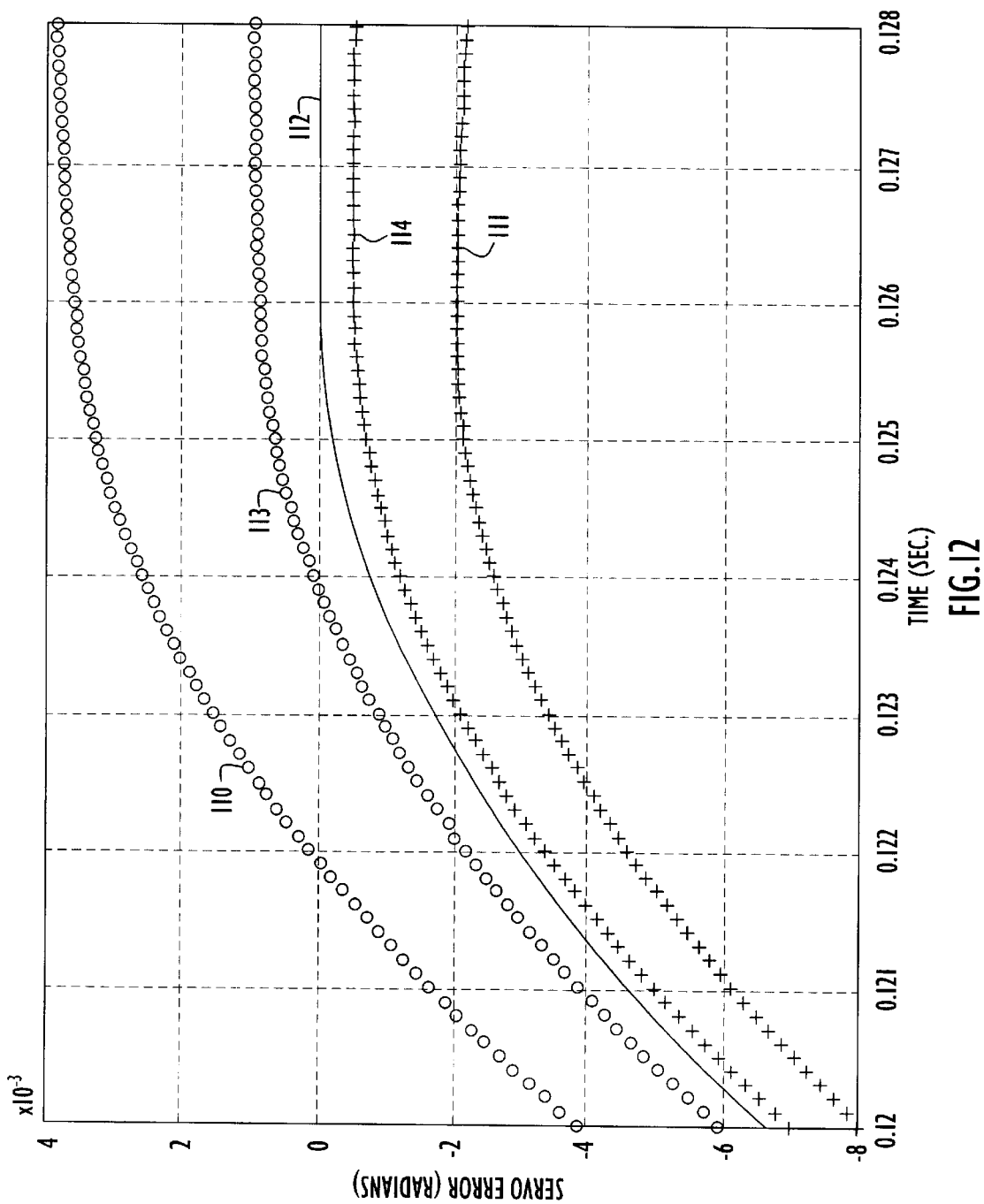
FIG. 12 is a plot showing the effect of learning control on position error.

Solving Eqs. (8) and (9) provides the constants in Eqs. (10) and (11), where e=331.34, f=−4.9901, g=15.482, and h=2.0664. When the values calculated for $\Delta A$ and $\Delta S$ from Eqs (10) and (11) are used in Eqs. (12) and (13) to calculate the new maximum and minimum amplitudes in the learning control algorithm with a learning gain of 0.75, the result is a rapid convergence of the final position to the desired position. This is shown in FIG. 12 for two initial bang-bang waveforms. The first initial bang-bang waveform 110 uses a positive pulse of +24 volts and a negative pulse of 20 volts, which pushes the output beyond the desired position (second cycle, i.e., first learning cycle). The second initial bang-bang waveform 111 uses a positive pulse of +18 volts and a negative pulse of −18 volts that does not reach the desired final position (second cycle, i.e., first learning cycle). Both initial outputs converge rapidly to the desired final position in eight cycles (converged outputs 113 and 114 in the third cycle (second learning cycle)). Solid line 112 in FIG. 12 represents the results of the final bang-bang input after seven learning cycles, in which the servo error is less than one µradian/volt.

Figure 13:
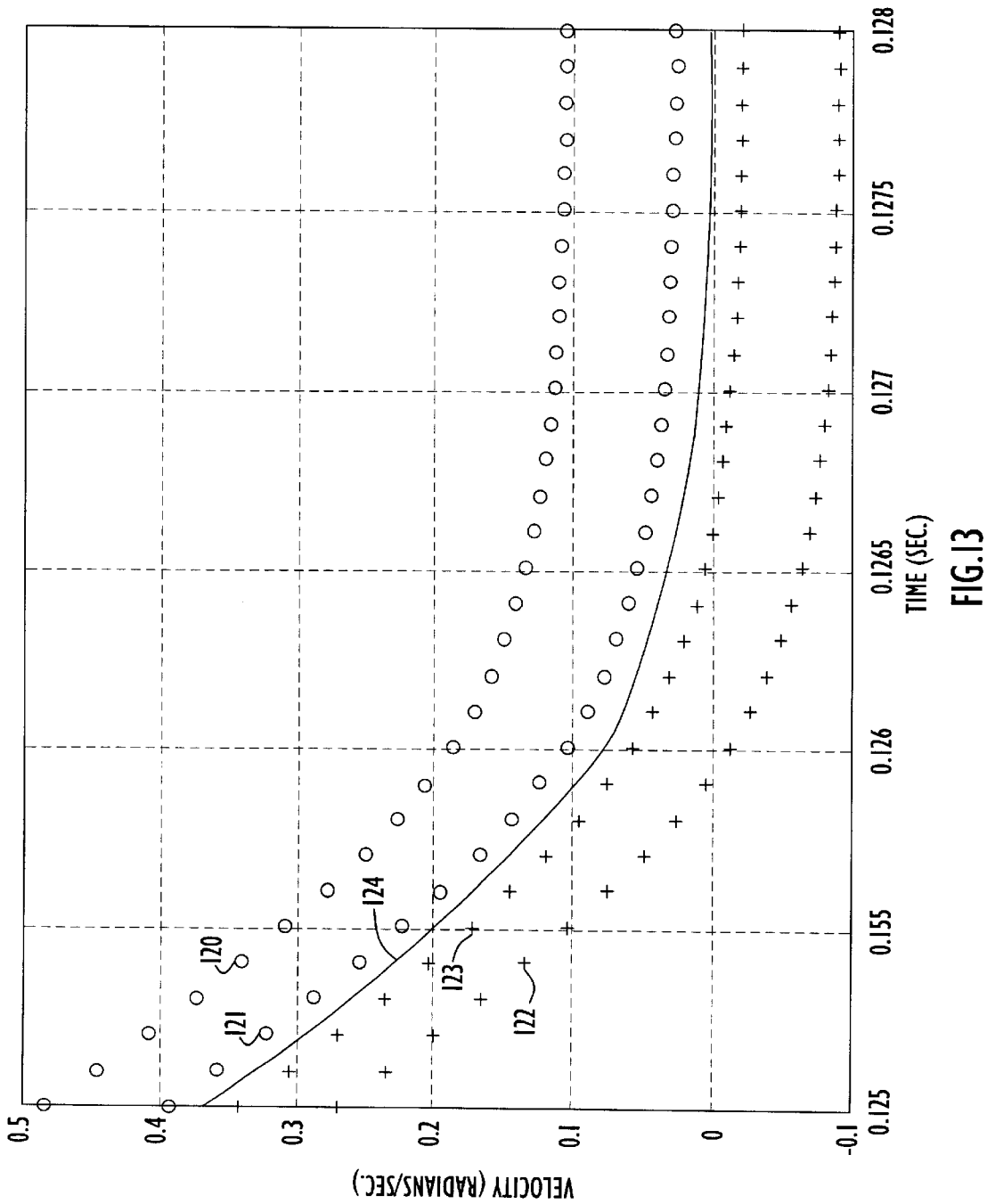
FIG. 13 is a plot showing the effect of learning control on velocity error.

The final velocity that is the result of these inputs is shown in FIG. 13. The final velocity converges to zero after 8 learning cycles. The final acceleration also approaches zero when no input is provided for 4 electrical time constants after the end of the bang-bang, input command. In FIG. 13 lines 120 and 121 are the velocity when the initial bang-bang input is selected so that the servo goes beyond the desired final position. Line 120 shows the velocity for the second cycle (first learning cycle), and line 121 shows the velocity for the third cycle (second learning cycle). Lines 122 and 123 are the velocity when the initial bang-bang input is selected so that the servo does not reach the desired final position. Line 122 shows the velocity for the second cycle (first learning cycle), and line 123 shows the velocity for the third cycle (second learning cycle). Solid line 124 in FIG. 13 represents the results of the final bang-bang input after seven learning cycles, in which the velocity is less than $3 \times 10^{-5}$ radians/sec.

The invention satisfies the need for rapid movement with small residual vibrations while minimizing the peak power in control systems. The combination of calculation of the first cycle open-loop amplitudes, the use of linear equations to determine the repetitive corrections, and continuous tuning of the open-loop amplitudes using repetitive/learning control are unique. Open-loop movement is rapid and efficient and the amplitudes of the open-loop, bang-bang, input are adjusted based on the position and velocity when the loop is closed.

Figure 14:
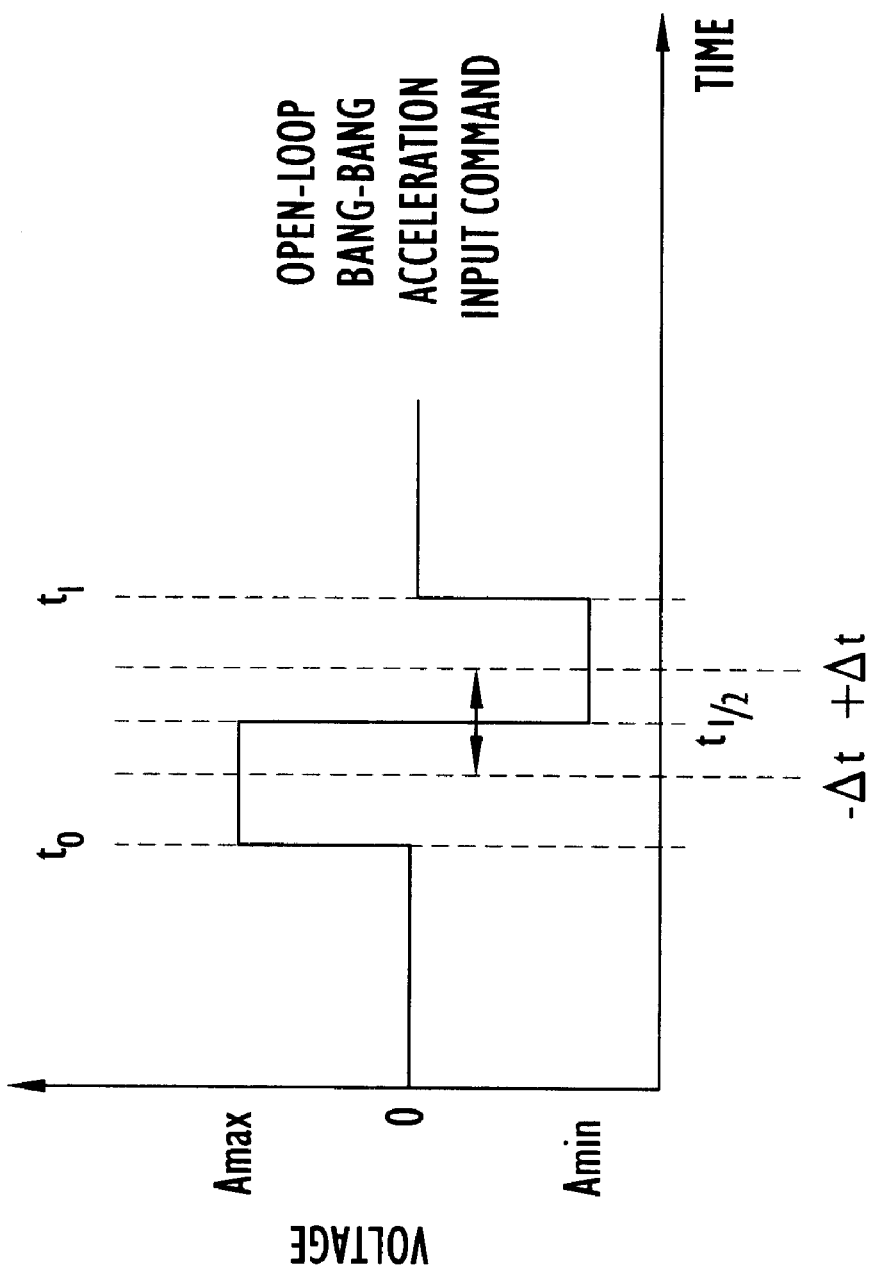
FIG. 14 is a graph showing a modified bang-bang control signal used as an open-loop command according to an alternative embodiment of the invention.

Although the invention has been described in terms of adjusting the amplitudes of a bang-bang command signal, other types of adjustments can be made to the open-loop command signal using iterative learning control. For example, the relative widths of the two portions of the bang-bang control signal can be adjusted in order to correct plant position errors. As shown in FIG. 14, the typical open-loop bang-bang acceleration input command is symmetrical about the center point labeled $t_{1/2}$ in FIG. 14. However, the transition point between the positive amplitude portion and the negative amplitude portion of the bang-bang input command can be moved either in the negative or positive direction by an amount Δt. This is shown in FIG. 14 by adjusting the positive to negative transition point of the bang-bang input command signal to be either $t_{1/2}-\Delta t$ or $t_{1/2}+\Delta t$. The parameter Δt can be determined according to the principles discussed above for determining the change in amplitude or shift in amplitude of an input command signal. The result of changing the transition time in a bang-bang control signal is to change the area of the command signal in order to adjust the movement of the plant. Hence, by using iterative learning control the transition time of the bang-bang input command can be adjusted based on such learning control to minimize residual vibrations in movement of a plant.

The present invention has many commercial applications in addition to use in weather satellite systems. For example, the principles described here can be used in automated manufacturing environments where robotic control is used in making precise, repetitive movements. Further, the invention can be employed, for example, in automated assembly devices, integrated circuit manufacturing, machine sequencers, and electronic placement for circuit card assembly. It will be understood that the invention can be used in many other applications requiring precise and repetitive periodic, point-to-point movement.

It will be understood that the invention can be practiced using computer programmable devices, and with using hardware and/or software designed to operate according to the descriptions here. For example, it will be understood that the operations described here can be performed using a computer program, embodied on a computer-readable medium, in which the computer program includes program instructions that cause a computerized apparatus to perform the operations described here.

Having described preferred embodiments of motor control methods and systems, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. An apparatus for controlling a motor, comprising:
    an open loop command generator configured to generate an open loop command for moving the motor;
    a closed loop controller configured to generate a closed loop command for moving the motor to correct an error in the movement resulting from the open loop command;
    a learning control unit configured to adjust the open loop command based on the error in the movement of the motor, the learning control unit including a storage unit having recorded therein an open loop command characteristic value from an open loop command used to move the motor in a preceding cycle, a calculation unit configured to calculate a parameter for adjusting the open loop command based on the sensed error, and an open loop command characteristic generator, coupled to the storage unit and the calculation unit, generating an open loop characteristic value by changing the open loop command characteristic from the storage unit based on the calculated parameter;
    a switching unit having open and closed loop positions, and configured for outputting the open loop command for controlling the motor when switched to the open loop position and outputting the closed loop command for controlling the motor when switched to the closed loop position; and
    a timing generator connected to the switching unit and outputting an open loop timing signal for controlling the switching unit to switch to the open loop position and outputting a closed loop timing signal for controlling the switching unit to switch to the closed loop position.

2. The apparatus of claim 1, further comprising:
    a sensor configured to sense movement of the motor in response to the open loop command; and
    an error detection unit configured to detect the error from the sensed movement of the motor.

3. The apparatus of claim 1, wherein the calculation unit is configured to calculate parameters ΔA and ΔS, where ΔA is a change in the magnitude of an amplitude of the open loop command, and ΔS is a change in an area of the open loop command.

4. The apparatus of claim 3, where $\Delta A=e^*\Delta P_f+f^*\Delta V_f$ and $\Delta S=g^*\Delta P_f+h^*\Delta V_f$, where e, f, g and h are constants, $\Delta P_f$ is a change in final position between the final position when the loop is closed in the cycle in which the open-loop command is applied and the final position when the loop is closed in a preceding cycle, and $\Delta V_f$ is a change in final velocity between the final velocity when the loop is closed in the cycle in which the open-loop command is applied and the final velocity when the loop is closed in a preceding cycle.

5. The apparatus of claim 4, wherein the open loop command characteristic generator generates the open loop characteristic value according to:

$$\text{NewMaxAmpl=OldMaxAmpl}-K^*(\Delta A+\Delta S)$$

$$\text{NewMinAmpl=OldMinAmpl}-K^*(-\Delta A+\Delta S)$$

where OldMaxAmpl is a maximum amplitude of an open loop command of a preceding cycle, and NewMaxAmpl is a minimum amplitude of an open loop command of said preceding cycle, and K is a gain factor.

6. An apparatus for controlling a motor, comprising:
    means for generating an open loop command for moving the motor;
    means for generating a closed loop command for moving the motor to correct an error in the movement resulting from the open loop command;
    means for adjusting the open loop command based on the error in the movement of the motor, the means for adjusting including storage means for recording an open loop command characteristic value from a preceding open loop command used to move the motor in a preceding cycle, means for calculating a parameter for adjusting the open loop command based on the sensed error, and generator means for generating an open loop characteristic value by changing the open loop command characteristic from the storage unit based on the calculated parameter;
    switching means for outputting the open loop command for controlling the motor when switched to an open loop position and outputting the closed loop command for controlling the motor when switched to a closed loop position; and timing means for outputting an open loop timing signal for controlling the switching means to switch to the open loop position and outputting a closed loop timing signal for controlling the switching means to switch to the closed loop position.

7. The apparatus of claim 6, further comprising:

sensor means for sensing movement of the motor in response to the open loop command; and means for detecting the error from the sensed movement of the motor.

8. The apparatus of claim 6, wherein the means for calculating calculates parameters ΔA and ΔS, where ΔA is a change in the magnitude of an amplitude of the open loop command, and ΔS is a change in a shift in area of the open loop command.

9. A method of controlling a motor, comprising:

controlling the motor in an open-loop control manner using an open-loop command to move the motor to a predetermined location, wherein the open-loop command is output when a switching unit is switched to an open loop position in response to an open loop timing signal;

controlling the motor in a closed-loop manner using a closed-loop command to correct errors in the open-loop control, wherein the closed-loop command is output when a switching unit is switched to a closed loop position in response to a closed loop timing signal;

determining errors in a position and velocity of the motor based on the closed-loop control; and determining, based on the position and velocity errors, an adjustment to the magnitude of an amplitude of the open-loop command for use in a subsequent open-loop control of the motor, wherein the determining an adjustment to the magnitude of the amplitude of the open-loop command includes calculating, based on the determined errors, a parameter for use in adjusting the magnitude of the amplitude of the open-loop command, and adjusting the magnitude of the amplitude of the open-loop command based on the calculated parameter, wherein the calculated parameter is an amplitude change ΔA calculated according to $\Delta A = e^*\Delta P_f + f^*\Delta V_f$, where e and f are constants, $\Delta P_f$ is a change in the motor's final position following the closed-loop control and the motor's final position upon completion of a closed-loop control operation in a preceding cycle, and $\Delta V_f$ is the change in the motor's final velocity following the closed-loop control and the motor's final velocity upon completion of a closed-loop control operation in said preceding cycle.

10. The method of claim 9, wherein the open-loop command is a bang-bang command signal.

11. The method of claim 9, further comprising generating a subsequent open-loop command having the adjusted amplitude.

12. A method of controlling a motor, comprising:

controlling the motor in an open-loop control manner using an open-loop command to move the motor to a predetermined location, wherein the open-loop command is output when a switching unit is switched to an open loop position in response to an open loop timing signal;

controlling the motor in a closed-loop manner using a closed-loop command to correct errors in the open-loop control, wherein the closed-loop command is output when a switching unit is switched to a closed loop position in response to a closed loop timing signal;

determining errors in a position and velocity of the motor based on the closed-loop control; and determining, based on the position and velocity errors, an adjustment to the magnitude of an amplitude of the open-loop command for use in a subsequent open-loop control of the motor, wherein the determining an adjustment to the magnitude of the amplitude of the open-loop command includes calculating, based on the determined errors, a parameter for use in adjusting the magnitude of the amplitude of the open-loop command; and adjusting the magnitude of the amplitude of the open-loop command based on the calculated parameter, wherein the calculated parameter is a shift in area of the open-loop command, the shift in area of the open loop command ΔS being calculated according to $\Delta S = g^*\Delta P_f + h^*\Delta V_f$, where g and h are predetermined constants, $\Delta P_f$ is a change in the motor's final position following the closed-loop control and the motor's final position upon completion of a closed-loop control operation in a preceding cycle, and $\Delta V_f$ is a change in final velocity between the motor's final velocity upon completion of a closed-loop operation and the final velocity upon completion of a closed-loop operation in said preceding cycle.

13. A computer program embodied on a computer-readable medium, for controlling a motor, the computer program comprising:

program instructions for controlling the motor in an open-loop control manner using an open-loop command to move the motor to a predetermined location, wherein the open-loop command is output when a switching unit is switched to an open loop position in response to an open loop timing signal;

program instructions for controlling the motor in a closed-loop manner using a closed-loop command to correct errors in the open-loop control, wherein the closed-loop command is output when a switching unit is switched to a closed loop position in response to a closed loop timing signal;

program instructions for determining errors in a position and velocity of the motor based on the closed-loop control; and program instructions determining, based on the position and velocity errors, an adjustment to the magnitude of an amplitude of the open-loop command for use in a subsequent open-loop control of the motor, wherein the program instructions for determining the adjustment to the magnitude of the amplitude of the open-loop command includes program instructions for calculating, based on the determined errors, a parameter for use in adjusting the magnitude of the amplitude of the open-loop command, and program instructions for adjusting the magnitude of the amplitude of the open-loop command based on the calculated parameter, wherein the calculated parameter is an amplitude change ΔA calculated according to $\Delta A = e^*\Delta P_f + f^*\Delta V_f$, where e and f are constants, $\Delta P_f$ is a change in the motor's final position following the closed-loop control and the motor's final position upon completion of a closed-loop control operation in a preceding cycle, and $\Delta V_f$ is the change in the motor's final velocity following the closed-loop control and the motor's final velocity upon completion of a closed-loop control operation in said preceding cycle.

14. The computer program of claim 13, wherein the open-loop command is a bang-bang command signal.

15. The computer program of claim 13, further comprising program instructions for generating a subsequent open-loop command having the adjusted amplitude.

16. A computer program embodied on a computer-readable medium, for controlling a motor, the computer program comprising:

program instructions for controlling the motor in an open-loop control manner using an open-loop command to move the motor to a predetermined location, wherein the open-loop command is output when a switching unit is switched to an open loop position in response to an open loop timing signal;

program instructions for controlling the motor in a closed-loop manner using a closed-loop command to correct errors in the open-loop control, wherein the closed-loop command is output when a switching unit is switched to a closed loop position in response to a closed loop timing signal;

program instructions for determining errors in a position and velocity of the motor based on the closed-loop control; and program instructions determining, based on the position and velocity errors, an adjustment to the magnitude of an amplitude of the open-loop command for use in a subsequent open-loop control of the motor, wherein the program instructions for determining the adjustment to the magnitude of the amplitude of the open-loop command includes program instructions for calculating, based on the determined errors, a parameter for use in adjusting the magnitude of the amplitude of the open-loop command; and program instructions for adjusting the magnitude of the amplitude of the open-loop command based on the calculated parameter, wherein the calculated parameter is a shift in area of the open-loop command.

17. The computer program of claim 16, wherein the shift in area of the open loop command $\Delta S$ is calculated according to $\Delta S = g^* \Delta P_f + h^* \Delta V_f$, where g and h are predetermined constants, $\Delta P_f$ is a change in the motor's final position following the closed-loop control and the motor's final position upon completion of a closed-loop control operation in a preceding cycle, and $\Delta V_f$ is a change in final velocity between the motor's final velocity upon completion of a closed-loop operation and the final velocity upon completion of a closed-loop operation in said preceding cycle.

* * * * *